May 6, 1969 R. H. MESERVEY 3,443,214
LIGHT REFLECTING MAGNETIC LIQUID APPARATUS
FOR MAPPING MAGNETIC FIELDS
Filed March 25, 1968

INVENTOR:
ROBERT H. MESERVEY
BY *Robert Shaw*
ATTORNEY

United States Patent Office 3,443,214
Patented May 6, 1969

3,443,214
LIGHT REFLECTING MAGNETIC LIQUID APPARATUS FOR MAPPING MAGNETIC FIELDS
Robert H. Meservey, Lexington, Mass., assignor to Massachusetts Institute of Technology, Cambridge, Mass., a corporation of Massachusetts
Filed Mar. 25, 1968, Ser. No. 715,713
Int. Cl. G01r 33/06
U.S. Cl. 324—43         17 Claims

ABSTRACT OF THE DISCLOSURE

Apparatus to show magnitude and pattern of a magnetic field over an area, wherein a thin layer of a magnetic liquid as, for example, ferric chloride is placed in the field region and the originally uniform surface of the layer becomes modulated under the influence of the field. Light directed upon the liquid surface made irregular by the influence of the magnetic field is reflected by the liquid surface and mixed with light not affected by the field to provide an optical fringe pattern which indicates magnetic field intensity and lines of equal intensity.

---

The invention herein described was made in the course of work performed under a contract with the Air Force Office of Scientific Research.

In laboratories and in production facilities, it is often necessary to determine with reasonable accuracy magnetic field intensity at a particular location, and it is often desirable to be able to see, also, contours of equi-field intensity. Devices for mapping magnetic fields are useful, among other thing, to examine the uniformity of field of an electromagnet, or, for example, to determine the uniformity of permeability of ferromagnetic sheets (or two dimension arrays) by subjecting the sheets to a transverse magnetic field and noting changes in the field rendered by the sheet as a result of local nonuniformities in the sheet, or to measure the distribution and magnitude of the current in a conductor which is confined to single plane and in particular to determnie if any current, or the proper current, is present in a particular conductor of a printed circuit board. Presently, the pattern of a particular magnetic field is made visible by the use of small iron filings or the like, but, by this method, no determination of the magnitude of the magnetic field is made. To determine magnitude, Hall effect probes or other point-by-point devices are used. See, for example, application for Letters Patent Ser. No. 690,145, filed Dec. 13, 1967, by the present inventor, for one such device.

Accordingly, an object of the present invention is to provide magnetic field mapping apparatus wherein the equi-field contours of a magnetic field are made visible and the magnitude of the magnetic field on any contour line can be determined.

Another object is to provide a field mapping apparatus adapted to allow visual observation of the magnetic field contours, but in which the contours can be photographed, televised, or counted, as required.

Still another object is to provide apparatus wherein a thin film magnetic fluid is placed in the influence of a magnetic field and the interference color of the fluid at any particular region of the surface is an indication of the field strength at that location.

Still further objects will be evident in the specification to follow and will be particularly pointed out in the appended claims.

By way of summary, the objects of the invention, generally, are attained in a magnetic field mapping apparatus comprising, in combination, a container with a thin-layer magnetic liquid, such as ferric chloride, disposed in the container and having a planar surface when placed in a uniform or zero field environment. The apparatus is adapted to be placed in a magnetic field so that nonuniformities in the field will create irregularities, as projections and depressions, of the liquid surface. An optical interferometer is provided to present a collimated monochromatic light beam simultaneously perpendicular to the liquid surface and to a reflective planar surface (which may be the bottom of the container or a separate surface as herein desclosed), a portion of the light being reflected from both the liquid surface and the planar reflective surface and mixed to provide at the image plane of the interferometer an optical fringe pattern of which each optical fringe is a contour line and each contour line is separated from an adjacent contour line by a height difference of the irregularities of the liquid surface equal in magnitude to a half wavelength of the light used.

The invention will be described with reference to the accompanying drawing in whch:

Figure 1:
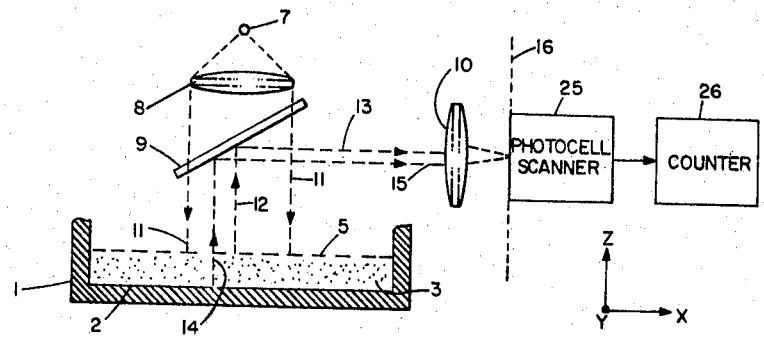
FIG. 1 is a schematic representation showing a preferred embodiment of the invention.

Referring now to FIG. 1, a magnetic field mapping apparatus is shown having a container 1 with a nonmagnetic reflective bottom 2. The container 1, shown in greater detail in FIG. 2A, may be made of glass or some other nonmagnetic material with a thin, nonmagnetic, reflective coating 4, as aluminum or the like, to reflect light for optical interference, as later discussed. A magnetic liquid 3, disposed in the container 1, is oriented to present a surface 5 that is planar (in the $x$–$y$ plane in FIG. 1) and perpendicular to the light beam of the interferometer in the absence of a nonuniform magnetic field H, as shown in FIG. 1 but adapted, in the presence of a nonuniform magnetic field, to become irregular (as represented by projection 6 and depression 8) at said surface, The nonuniformity of magnetic field H that affects the fluid 3 is a nonuniformity at separated regions in the $x$–$y$ plane, and the magnitude of the irregularity (variation in elevation) in the $z$ direction at one region as compared to a neighboring region is a function of the difference of the squares of magnetic field intensity at each region, as later discussed. The irregularities at the surface 5 can be mapped in a manner that will now be explained.

Figure 2A:
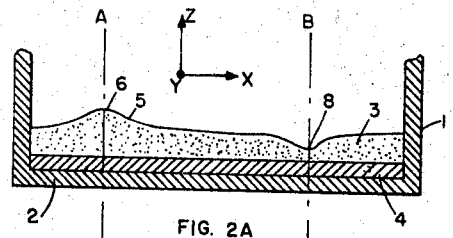
FIG. 2A shows, in cross section on an enlarged scale, a portion of the apparatus shown schematically in FIG. 1, particularly to show in detail irregularities in a magnetic fluid under the influence of a nonuniform magnetic field (H)
Figure 2B:
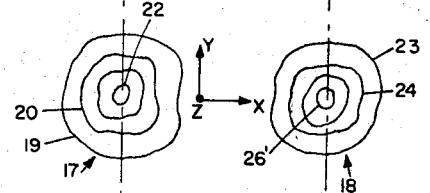
FIG. 2B is an optical fringe pattern showing lines or contours of equal magnetic field intensity in the magnetic fluid of FIG. 2A under the influence of the nonuniform field.
Figure 2C:
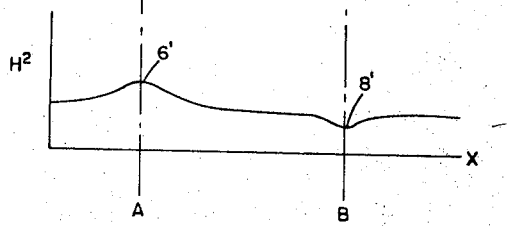
FIG. 2C is a non-scaler graph of $H^2$ as a function of spatial position in the $x$ direction in the fluid of FIG. 2A.

A Fizeau interferometer is shown FIG. 1 comprising a source 7 of monochromatic light, a collimating lens 8, a beam splitter 9 and a condensing or focussing lens 10. Electromagnetic energy from the light source 7 passes through the lens 8 which collimates the energy and directs it along a path 11 (in the $z$ direction) that is perpendicular to the undisturbed surface of the magnetic fluid. A portion of the input light energy is reflected by the liquid surface 5, as represented by dotted line 12, and a portion is reflected by the reflective coating 4, FIG. 2A, as represented by dotted line 14. The reflected light represented by the lines 12 and 14 is reflected by the beam splitter 9 to the paths shown at 13 and 15, respectively, and is focussed by the condensing lens 10 and observed at the image plane of the interferometer 16, that is, the image plane of the liquid surface 5 formed by lens 10. Under certain conditions an interference pattern will appear at the image plane 16 due to interference between the light represented by the lines or beams 12 and 14. By having the comparison planar reflector 4 exactly parallel to the liquid surface, it is possible to have no interference pattern when the fluid is in the undisturbed stage depicted in FIG. 1 where H is zero (or uniform). However, when the magnetic field H is nonuniform as shown in FIG. 2C, a series of irregularities or differences in height appear at the liquid surface, as shown in FIG. 2A. Light passing through the projection 6 in the liquid 3 will have a longer optical path length than light passing through either the depression 8 or undisturbed regions in the fluid. Now interference will occur and a pattern of interference fringes will appear at the image plane 16, a pattern which is determined by the strength of the field H at each region within the fluid in the x–y plane, i.e., the plane of the unmodulated liquid surface. The pattern of the magnetic field H within the liquid 3 appears at the image plane 16 of the interferometer as an optical fringe pattern, as shown, for example, at 17 and 18 in FIG. 2B of which each optical fringe is a contour line (as 19 and 23) and each contour line is separated from an adjacent contour line (as 20 and 24, respectively) by a height difference in the z direction of a half wavelength of the light used. The pattern may be viewed at the image plane 16 by the eye with or without the aid of an occular, it may be scanned by a photocell scanner 25 the output of which is fed to a counter 26, it may be recorded by a television camera for subsequent processing of information, it may be recorded on a film sensitive to the monochromatic light used, or it may be recorded in any one of a number of other ways.

The resulting field map can contain any number of individual patterns depending upon the extent of the irregularities in the surface 5. Two such patterns are shown in FIG. 2B where the central contour line shown at 22 represents a projection or peak 6 in the liquid of 2A (along A—A) and maximum 6′ in the magnetic field in FIG. 2C, and the central contour line shown at 26′ represents a depression 8 in the liquid (along the line B—B) and a minimum 8′ in the magnetic field. Each contour line represents locations in the fluid 3 at which the absolute value of the magnetic field H is equal at all points therealong. And, as mentioned, each line represents a height differential in the z direction of λ/2 (one-half wavelength in the liquid) from an adjacent line. It is possible, therefore, to determine the difference in height between the peak 6 and the depression 8 by counting the number of intervening contour lines and to relate the height differential to the magnetic field intensity at each location, since the height differential is proportional to the differences of the squares of the magnitude of magnetic field H, as shown in the following relationship:

$$h - h_0 = \frac{\frac{1}{2}(\mu - 1)(H_1^2 - H_0^2)}{\rho g}$$

where: $h_0$ is the undisturbed height or depth of the fluid 3, $h$ is some other height of fluid, $H_0$ is a reference level of magnetic field within the liquid at a first region thereof and may be zero or uniform field, $H_1$ is the magnetic field intensity at some other region displaced from the first region in the x–y plane direction, $\mu$ is the permeability of the fluid 3, $\rho$ is the density of the fluid, and $g$ is the acceleration of gravity. The absolute value of magnetic field H, at any point, can be calculated from $(h-h_0)$ by knowing the constants $\mu$, $\rho$, $g$, or by measuring the field at two locations with a Hall probe or similar device. When viewing the patterns at the image plane 16, it is possible to determine whether a particular pattern, as the pattern 17, represents a hill or a valley. See Procedures in Experimental Physics, by John Strong (Prentice-Hall, Inc.), seventeenth printing, August 1952, at page 64.

Figure 3:
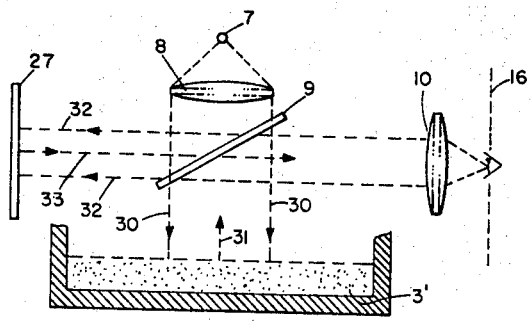
FIG. 3 is a schematic representation of a modification of the apparatus of FIG. 1.

In the apparatus previously discussed herein the light from the source passed through a transparent liquid 3, but an opaque liquid as that shown at 3′ in FIG. 3 may also be used. In FIG. 3 elements that perform like functions to similar elements in FIG. 1 are similarly numbered. Light from the collimating lens 8 is divided at the beam splitter 9 to pass both to the surface of the opaque fluid 3′ where it is reflected as before and simultaneously to a reflective planar surface 27. The path to the liquid surface is shown at 30 and that to the reflective planar surface is shown at 32. Reflected light shown respectively at 31 and 33 is mixed, as before, and the optical fringe pattern due to disturbances of the liquid surface appears at the image plane 16, as previously discussed. The contours of equal magnetic field are separated by λ/2 difference in height as before, but with the wavelength as measured in air instead of in the liquid.

The liquid 3 may be a saturated solution of ferric chloride (as may be also the liquid 3′), but other solutions, as colloidal dispersions of ferrites, may be used, as well; however, the permeability $\mu$ of whatever fluid used must differ from unity and may be above or below that value. The layer of fluid may be of the order of .010″ in depth. The glass bottom 2 may be ½″ thick or if fine detail of local field variations are to be observed, it could be as thin as .003″.

Figure 4:
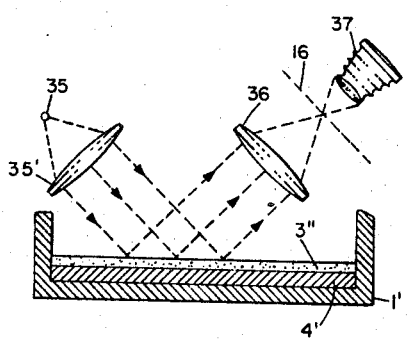
FIG. 4 is a schematic representation of a further modification.

In the field mapping apparatus of FIG. 4, a very thin film 3″, of the order of less than about five wavelengths of the light used (about 5,000 Angstroms to about 25,000 Angstroms), as in an evaporgraph, provides color changes in response to changes in magnetic field. A source of white light 35 will direct substantially collimated light energy upon the fluid if the source is removed some distance from the fluid 3″. For present purposes a distance of ten times the diameter of the liquid container will suffice; and, of course, a collimating lens, as 35′, can be used. The light in the embodiment of FIG. 4 can be directed at an angle to the surface of the fluid, or a beam splitter arrangement could be used. A portion of the light so directed is reflected by the surface, and a portion passes through the fluid to be reflected by a planar reflective bottom surface 4′ of the container shown at 1′. If the depth of fluid is correct, the light reflected from the fluid surface will mix with the light reflected from the planar surface 4′ to provide an interference pattern that will provide color distinctions that may be focussed by a lens 36 to be viewed or received at the image plane 16 by a camera or other device 37. The color at any particular region of the fluid surface is the interference color corresponding to the depth of the liquid at that region which, in turn, is determined by the strength of the magnetic field at that particular region, as previously discussed. The embodiment in FIG. 4 is not adapted to map large changes in magnetic field, but is limited to changes over a factor of about 20. The fluid 3″ may be ferric chloride, as before, or other magnetic fluid which is essentially transparent in thin layers of the order of five microns.

What is claimed is:

1. A magnetic field mapping apparatus comprising, in combination, a container having a nonmagnetic reflective bottom, a magnetic liquid disposed in the container, the apparatus being adapted to be placed in a magnetic field so that differences in magnitude of the magnetic field will create differences in the height of the liquid surface, the difference in height being proportional to the differences of the squares of the magnitude of magnetic field, and an optical interferometer adapted to present a collimated monochromatic light beam perpendicular to the liquid surface and the reflective bottom of the container, a portion of the light being reflected by both the liquid surface and the reflective bottom, the magnetic field pattern within the liquid appearing at the image plane of the interferometer as an optical fringe pattern of which each optical fringe is a contour line and each contour line is separated from an adjacent contour line by a height difference of a half wavelength of the light used.

2. Apparatus as claimed in claim 1 in which a pickup means is provided at the image plane to view the optical fringe pattern.

3. Apparatus as claimed in claim 2 in which the pickup means comprises a photocell scanning device and a counter, in combination.

4. Apparatus as claimed in claim 2 in which the pickup means is film sensitive to the frequency of the monochromatic light.

5. Apparatus as claimed in claim 1 and in which the bottom is a thin planar bottom and the liquid is a thin layer of uniform depth, the bottom being parallel to the upper surface of the fluid in the absence of a magnetic field.

6. Apparatus as claimed in claim 5 and in which the fluid is ferric chloride.

7. Apparatus as claimed in claim 5 and in which the fluid is a colloidal dispersion of ferrites.

8. A method of mapping a magnetic field that comprises, directing the field through a layer of magnetic liquid, the depth of the liquid being uniform in a uniform magnetic field and being nonuniform when subjected to a magnetic field varying in magnitude within the liquid in a direction parallel to the plane of the surface of the liquid, the magnitude of depth variations being a function of the magnitude of the field differences in said direction, and directing collimated monochromatic radiation upon said upper surface, reflecting the radiation from said upper surface and from a planar surface below said upper surface, the reflected radiation appearing at the image plane as an optical fringe pattern wherein each optical fringe is a contour line and is separated from an adjacent contour line by a distance equal to one-half the wavelength of the radiation.

9. A method as claimed in claim 8 in which the fluid layer is a horizontally disposed thin layer the upper surface of which is free to move vertically, and regions of nonuniform magnetic field and corresponding nonuniformity in liquid depth occur at locations horizontally displaced from other regions.

10. A method as claimed in claim 8 in which the radiation is in the optical range and the reflected radiation is directed upon a film to record the fringe pattern.

11. A method as claimed in claim 10 and in which the radiation is directed from above, the direction of propagation of the radiation being substantially orthogonal to the material surface.

12. A method as claimed in claim 8 and in which said planar surface is parallel to said upper surface when the magnetic field magnitude is uniform throughout the liquid.

13. Apparatus for mapping a magnetic field that comprises, a magnetic material the dimensions of which change as a function of the magnitude of the magnetic field, the material being one that will reflect electromagnetic waves, means for directing electromagnetic wave energy upon the material which reflects at least a portion of the electromagnetic energy at the material surface and simultaneously directing the electromagnetic energy to a reflective surface, and means for mixing the radiation reflected from the material surface with the radiation reflected from the reflective surface to provide an interference pattern which is determined by said dimensions.

14. Magnetic field mapping apparatus comprising, in combination, a thin film magnetic fluid the depth of which changes as a function of the magnetic field, the material being one that will reflect and pass light energy, a source of light energy adapted to direct substantially collimated light waves upon the fluid, a portion of which is reflected by the surface of the fluid and a portion of which passes through the fluid, a planar reflective surface adapted to receive the light waves that pass through the fluid and reflect the same, the light waves reflected from the surface of the fluid mixing with the light waves reflected from the planar surface to provide an interference pattern determined by said depth.

15. Apparatus as claimed in claim 14 in which the light source is a source of white light disposed a substantial distance from the fluid so that light energy from the source received by the material is substantially thereby collimated, the light being directed at an angle to the fluid surface.

16. Apparatus as claimed in claim 14 in which means is provided to record the interference pattern.

17. Apparatus as claimed in claim 14 in which the depth is less than about five wavelengths of the light and the interference patterns provide color distinctions representative of the magnitude of the magnetic field at regions in the fluid.

References Cited

UNITED STATES PATENTS 3,239,753   3/1966   Arnold _____ 324—43

FOREIGN PATENTS 1,009,061   11/1965   Great Britain.

RUDOLPH V. ROLINEC, *Primary Examiner.*

ALFRED E. SMITH, *Assistant Examiner.*

U.S. Cl. X.R.

88—14; 252—62.52